Figure 1:
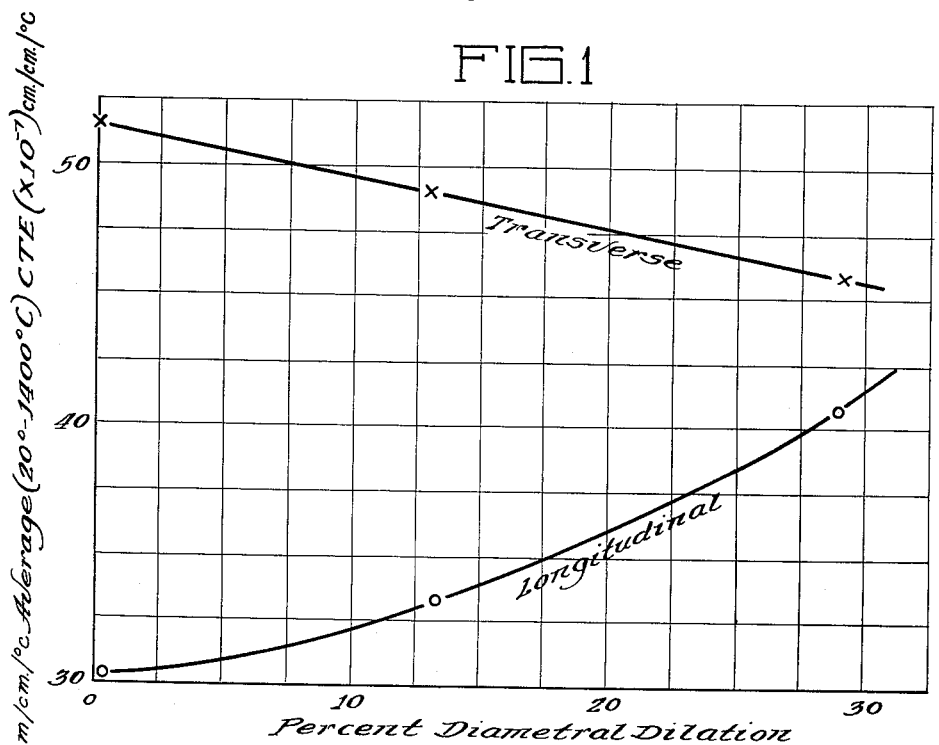

Inventor:
Edward C. Thomas

United States Patent Office 3,008,744
Patented Nov. 14, 1961

3,008,744
GRAPHITE ELECTRODE NIPPLE AND METHOD FOR PRODUCING SAME
Edward C. Thomas, Lewiston, N.Y., assignor to Great Lakes Carbon Corporation, New York, N.Y., a corporation of Delaware
Filed Sept. 22, 1958, Ser. No. 762,603
10 Claims. (Cl. 287—127)

This invention relates to carbon and graphite bodies having improved thermal expansion properties and to methods for their manufacture. More particularly, it relates to graphite nipples for joining carbon and graphite electrodes, having improved thermal expansion properties, and to a method for producing such nipples.

The use of carbon and graphite electrodes in electrothermal processes is well established. For example, graphite electrodes find particular utility in the manufacture of special alloy steels. The high temperatures needed to melt the metals and other raw materials employed in electrothermal furnaces are obtained by passing an electric current of high amperage as an arc established between the electrodes and the charge. The resultant high temperature arc produces the melting, smelting or other electrothermal action desired.

A method most commonly used to join electrodes into a column for electric furnace applications is an assembly consisting of a threaded male section (nipple) connecting the female ends (sockets) of adjoining electrodes. This assembly is referred to as an electrode joint and there are many arguments in support of its being the best system for this purpose, all factors pertaining to its operation being considered. The nipple, of necessity, has a reduced cross-section compared with the column it supports; hence, it should normally have a higher tensile strength than the balance of the column. However, certain physical properties contributing to increased strength also accentuate other properties such as the thermal expansion. When the diametric thermal expansion of the nipple exceeds that of the electrode sockets which it joins (and in which it is enveloped), severe tensile or hoop stresses are developed in the socket walls by the expanding nipple both when the joint is heated and also when the heated joint is suddenly cooled. These stresses may well exceed the tensile strength of the socket material. As a result of this stressed condition, the socket wall often splits with frequent loss of those portions of the column below the split.

It has been previously proposed to reduce such socket splits by the use of specially shaped nipples or plugs. By cutting slots in various strategic parts of the nipple, excessive expansion of the nipple on heating could presumably be effectively neutralized. Instead of expanding in diameter, the nipple will yield in the slotted region. While such techniques have presumably had limited success, the removal of structural portions of the nipple will often result in a weakening of the over-all structure.

It has heretofore been the usual practice in the manufacture of graphite electrode nipples to use ordinary petroleum cokes such as those produced by coking topped or reduced crude oils in standard coking units (delayed cokers, shell stills, etc.). Nipples produced from such cokes have substantial overall strength, but also have relatively high coefficients of thermal expansion (C.T.E.). When such nipples are used in electrodes made from the same quality coke, the jointing problems are not too serious, although other considerations make such a system distinctly unattractive. However, when such nipples are used to join electrodes made from higher quality electrode cokes, such as cokes having a needle-like structure as described by Shea in U.S. Patent No. 2,775,549 and which exhibit parallel alignment during extrusion, the greater thermal expansion of the nipple over that of the electrode sockets causes frequent socket splits.

It is known to the art that it is desirable to use needle-like cokes in the manufacture of large diameter (such as 18" to 24" diameter) graphite electrodes. The importance of the problem of providing satisfactory nipples for such electrodes has assumed considerable proportions. If needle-like coke is also used in the nipples, the problem is not solved, because of the singular extrusion properties of such cokes; that is, on extrusion through a die, the needle-like particles become so oriented that their longitudinal axes are substantially parallel to the direction of extrusion. The result is an extruded product having anisotropic thermal and electrical properties as well as an anisotropic structure. The ratio of the transverse to the longitudinal coefficients of thermal expansion, by virtue of the extrusion, is usually greater than 2.0. Furthermore, by virtue of the anisotropic structure, the product is substantially lacking in over-all strength. It becomes apparent that conventional methods of producing nipple stock from needle-like cokes are unsatisfactory.

It is an object of this invention to provide carbon and graphite bodies having improved and controlled thermal properties.

It is a further object of the invention to provide a process for the manufacture of carbon and graphite electrode nipples whereby the transverse and longitudinal thermal expansion properties of the nipple can be controlled with respect to the thermal expansion properties of the carbon or graphite electrodes which are joined by the nipple.

It is a further object of this invention to provide carbon and graphite nipples which have a relatively low transverse thermal expansion.

It is a further object of this invention to provide carbon and graphite nipples of low electrical resistivity and high over-all strength.

The above objects as well as others which will become apparent upon more complete understanding of the invention as subsequently herein described are accomplished by employing as the raw material for nipple manufacture coke particles having a needle-like structure and which, when extruded with pitch or other conventional binders through a die, will align themselves in parallel arrangement with respect to each other to produce an anisotropic body. I have found that the transverse thermal expansion properties of an extruded mixture of such coke with a pitch binder can be controlled and favorably reduced by suitably manipulating the extruded product by various techniques; for example, by compressing the extruded product in the longitudinal direction while allowing it to expand in diameter. By the means just mentioned, such improvement in the thermal properties can be accomplished without loss of other desirable properties in the baked and graphitized product by limiting the expansion in diameter to between about 1 to 30%, preferably between about 10 to 20%.

It is an essential element of this invention that the coke aggregate used have a needle-like structure. Such coke not only has a metallic luster and striated appearance when examined with the naked eye, but also when the coke is minutely ground and examined under a microscope. Such coke has a low electrical resistivity and a lower coefficient of thermal expansion as compared to ordinary cokes. An example of needle-like coke suitable for purposes of this invention is that formerly produced by the Kendall Refining Company at their Bradford, Pennsylvania, plant or by the methods disclosed in the previously referred-to Shea patent. However, any needle-like coke is suitable providing it has an average C.T.E. (300°–800° C.) of less than $25 \times 10^{-7}$ as determined by a standard procedure hereinafter described. Carbon bodies produced according to the methods herein described are to be used for electrode nipple stock. It is a preferred although not essential element of this invention that the specified coke particles or aggregate have a well-defined particle size (Tyler screen); that is, not more than about 25% by weight of the particles should be coarser than 20 mesh, not more than 50% of the particles should be coarser than 35 mesh, and at least 50% of the particles should be finer than 40 mesh. If the graphite bodies to be produced in accordance with the methods described herein are to have a modulus of rupture (as determined by ASTM procedures) of 2,000 pounds per square inch, and preferably 2,400 pounds per square inch for some electrode nipple stock applications, the carbon aggregate must have the previously described particle size distribution, in addition to the requirement that they be needle-type coke particles. The particle size distribution and structure of the carbon aggregate raw material is substantially retained through the graphitizing process and the resulting graphitized specimen can be examined by microscopic methods which are familiar to those skilled in the art so that the final graphite products can, in part, be characterized by the particle size distribution and structure of the carbon aggregate raw material.

In one embodiment of the invention, an extrusion mixture is prepared from a mixture of comminuted needle-like coke and a pitch binder. The mixing operation is usually conducted above the melting point of the binder in order to insure uniform distribution of the binder throughout the coke aggregate. A small amount of a viscous petroleum oil may be added as a lubricant. The mixture, heated to a plastic state, is extruded through a die and a piece of the extruded product, heated to a plastic state, is then placed in a container or mold of slightly greater diameter and then compressed in a longitudinal direction so as to effect an increase in the transverse cross-sectional area of the piece to such extent that the ratio of the transverse to longitudinal average C.T.E. (20°–1400° C.) of the compressed product after baking and graphitizing will be reduced to between about 1.2 to 1.5. The amount of diametric increase in the extruded stock will depend upon the thermal expansion properties of the electrode system with which it will be employed, the object being to produce a joint which will, while in use, set up a minimum of thermal stresses. If the extruded product is in the form of a cylinder, it has been found that this reduction is obtained by an increase in a diameter of the compressed piece of between about 1% to about 30%. The compressed green piece is then baked in order to carbonize the binder after which it is subjected to higher temperatures in order to graphitize the body. A nipple of conventional form is then machined from this graphite stock.

In a preferred embodiment of the invention, an extrusion mixture is prepared as described above. This mixture is heated to the plastic temperature and extruded through a cylindrical die having a diameter between about 8 to 12 inches to produce nipple stock for electrodes of 18 to 24 inches in diameter. Preferably, this extrusion die should have an internal contour resembling that of the Schiele anti-friction curve. A suitable length of the extruded product is then axially aligned in a container or mold of such construction as to permit compression in a longitudinal direction and expansion in diameter of between about 10 to about 20% about half-way between the ends of the piece. The container or mold should taper toward its ends so that the resulting compressed piece will have a uniformly diminishing diameter in the two halves thereof toward its ends. On baking and graphitizing in the conventional manner, the graphite stock may be machined into a tapered nipple with a minimum of waste.

Since the thermal expansion characteristics of a carbon body may vary according to its processing history and formulation, it is necessary to specify the method to be used in determining the C.T.E. of a particular coke considered for use in this invention. The coke on which the C.T.E. is to be determined is milled until 100% of its particles will pass through a 40 mesh screen (Tyler). This coke flour is then mixed with a pitch binder and extruded through a die of about one inch in diameter and having an internal contour resembling the Schiele anti-friction curve. The extruded product is baked and graphitized according to standard practice. Thermal expansion measurements are made at 300° C. and at 800° C. after which the average coefficient for this range is computed. This average should then fall within the C.T.E. range for the coke recommended and employed in making nipples according to this invention. This method of measurement is also used to determine the average C.T.E. of the nipple between 20° to 1400° C. C.T.E. values or units reported herein are in cm./cm./° C.

The improvement obtained by the axial compression of extruded nipple stock in a mold of slightly greater diameter is due to the resulting disalignment of the needle-like particles. As mentioned previously, extrusion results in the alignment of the particles in the direction of extrusion. This alignment of the particles has a profound effect on certain properties of the carbon body as a whole. Notable among those properties affected are the coefficients of thermal expansion in both longitudinal and transverse directions. As a result of the extrusion, the C.T.E. in the longitudinal direction is lower than that in the transverse direction. When the "green" extruded stock is compressed in its longitudinal direction, according to my invention, the anisotropic arrangement of particles can be gradually altered so as to give a controlled isotropic arrangement. Due to the more nearly isotropic arrangement of the particles, the thermal expansion properties are also made more nearly isotropic. If the compression of the extruded piece is carried far enough, it will result in an essentially isotropic arrangement of particles and, accordingly, essentially isotropic thermal expansion properties. However, complete isotropy is not considered to be desirable for nipple stock because in attaining it, the longitudinal coefficient of thermal expansion is increased to an unfavorable degree. When this longitudinal C.T.E. is too high, there will be too great a differential between it and the longitudinal C.T.E. of the carbon or graphite electrode socket into which the nipple is fittted. As a result of this unfavorable differential expansion, temperature increases would set up stresses which would cause the joint to loosen. Therefore, it is essential to alter the anisotropic alignment of particles to such a degree that the transverse C.T.E. is sufficiently lowered to obviate socket splits, but on the other hand, not to so high a degree as to create a condition which will result in serious loosening of the joint. I have found that this desired result is obtained by axially compressing the extruded nipple stock only to such a degree as to increase its diameter from between 1 to 30%, preferably 10 to 20%. These limitations on the increase in diameter may also be stated as such an increase in diameter that the ratio of the transverse to longitudinal average C.T.E. (20°–1400° C.) of the compressed product after baking and graphitizing will be within the range of about 1.2 to about 1.5.

Although it is most likely that one practicing this invention will do so by axially compressing a solid, cylindrical extruded piece to an increased diameter, it is possible to attain the same results by a variation in these steps. For instance, if the extruded piece to be compressed is a hollow tube, the result desired by this invention is attained by axially compressing the tube within a mold or container of approximately the same diameter as the extruded piece with the result that the hollowed portion of the tube will be partially or wholly displaced by the plastic mixture.

In another modification of the invention, if the extruded piece to be compressed has a rectangular cross-section or any other irregular shape, the desired result is obtained by axially compressing in such manner as to increase its cross-sectional area within the limitations herein set forth. The function of the compression step is to disalign the anisotropic arrangement of the particles resulting from extrusion.

It is within the purview of this invention to include all methods by which an increase in cross-sectional area may be obtained on compressing, in the longiudtinal direction, an extruded preform of any cross-sectional configuration. For example, in another embodiment of the invention, carbon aggregate of the type hereinbefore described, together with pitch binder, the mixture having been heated to a temperature within the range of 140°–170° C., is extruded through a die having an internal contour resembling a Schiele curve, which die is provided with an enlarged section of substantially uniform diameter at the end of the straightaway section of the die. When the operation is commenced, the open end of the enlarged section is plugged or otherwise suitably blocked off and the mixture of needle coke particles and pitch binder is extruded through the die into the enlarged section until the latter is completely filled, after which the plug or closure is removed and the extrusion is continued until the raw material is exhausted. The viscosity of the mixture of needle coke particles and pitch binder is so regulated that there will be sufficient friction or drag of the mix on the walls of the enlarged section of the die to create adequate back pressure during the extrusion operation. By adjusting the diameter of the enlarged portion of the die to the diameter of the initial straightaway section, the desired degree of dilation of the initial preform is accomplished.

In a further embodiment of the invention, carbon or graphite bodies having controlled thermal properties, particularly with respect to their longitudinal and transverse thermal expansion characteristics, are extruded through a die of the type just described, and the flow pattern of the carbonaceous mixture being extruded is altered by imparting a twisting motion to or upon the extruding mixture, said twisting motion being in addition to the normal laminar axial flow pattern which an extruding mixture experiences in a normal extrusion operation. The twisting motion is imparted to the extruding mixture by introducing on to the interior surface of the contoured section of the die a "screw-type" pattern similar to the rifling in a gun barrel. As the charge is forced through the altered section of the die, it will receive a twisting motion relative to the constricted material in the straightaway section of the die. The twisting motion should be of the order of 15°–45°, and preferably between 25°–35°, with reference to and about the axis of extrusion. Not only does this type of manipulative technique disalign the needle-type coke particles to provide a control over the relative transverse to longitudinal thermal expansion properties of the final carbon or graphite body, but I have found that this type of extrusion minimizes laminar voids and, to some extent, the porosity which is usually found in such extrusions prepared by conventional extrusion practices. As a result of the component of twisting motion induced by the rifled alterations in the die, the long axes of the normally geometrically aligned anisotropic coke particles will be inclined with respect to the axis of extrusion, and, hence, with respect to the longitudinal axis of the extruded body.

In order to more fully illustrate the nature and character of the invention, but with no intention of being limited thereby, the following specific examples are set forth:

EXAMPLE I

A needle-like petroleum coke, having an average C.T.E. (300°–800° C.) of 23, obtained from the Kendall Refining Company of Bradford, Pennsylvania, was milled to a particle size of 60%, −40 mesh and mixed with a pitch binder in the conventional manner. The mixture was heated until plastic and then extruded by an extrusion press of the type used in extruding electrodes, through a die having the conventional internal contour of a Schiele curve. The resulting extruded piece which had a diameter of 10 inches was divided into three pieces of equal length. Two of the pieces were centrally aligned in cylinders having 11¼ inch and 13 inch inside diameters, respectively. After reheating to the plastic temperature, a compressional force of 2500 p.s.i was then exerted in the direction of the longitudinal axis of each cylinder to dilate the diameters of the pieces to that of the cylinders. The third piece was not compressed. The three pieces were then baked in the conventional manner and graphitized to about 2900° C. Thermal expansion measurements were then made on transverse and longitudinal sections. The tabulation of the data taken on these pieces are found in Table I.

Table I

[Average C.T.E. (20°–1400° C.) of 10″ dia. extruded graphitized stock with and without compression to larger diameters]

| | Control (10″ dia.) | 10″ dia. to 11¼″ dia. | 10″ dia. to 13″ dia. |
|---|---|---|---|
| Transverse [1] | 51.7 | 48.8 | 45.5 |
| Longitudinal [1] | 30.1 | 33.2 | 40.1 |
| T/L | 1.72 | 1.47 | 1.13 |

[1] Multiply values by 10⁻⁷.

Figure 2:
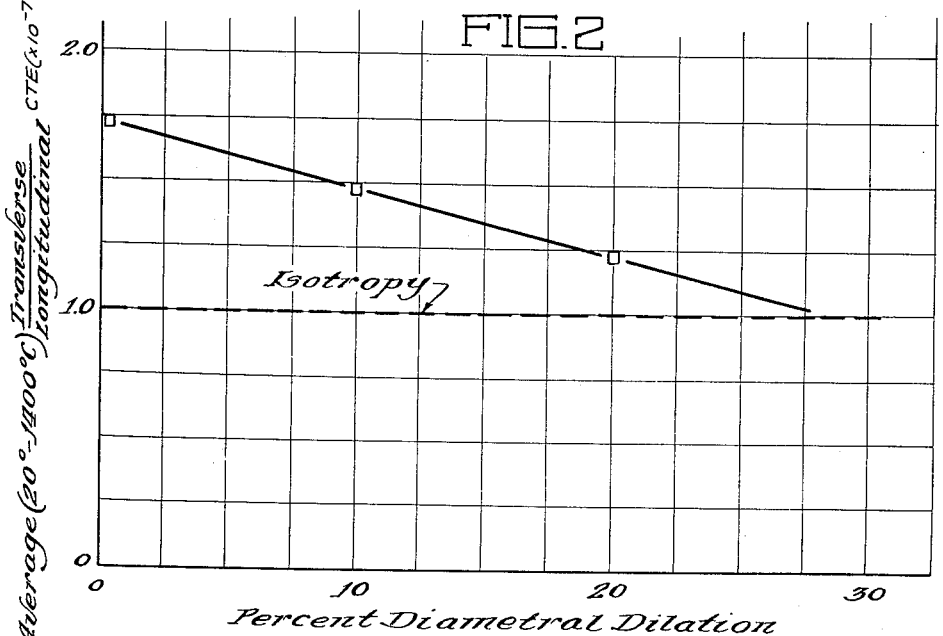

From an examination of these data, it is apparent that the axial compression with consequent increase in diameter has decreased the transverse coefficient of thermal expansion. The piece increased to 11¼ inches in diameter (about a 13% increase) has had its transverse C.T.E. reduced about 5½%. The piece increased in diameter to 13 inches (a 30% increase) has had its transverse C.T.E. reduced about 12%. Likewise, in each of the above cases, the ratio of the transverse to the longitudinal C.T.E. has been decreased. The above results and others are effectively illustrated in FIGURES 1 and 2. In these figures the designation "dilation" refers to the increase in diameter in each instance. FIGURE 1 shows the influence of an increase in diameter on the transverse and longitudinal coefficients of thermal expansion resulting from the systematic dilation of green extruded stock. FIGURE 2 illustrates the decrease in the ratio of the transverse to longitudinal C.T.E. resulting from the same dilation of green extruded stock. It is apparent from the curves in both of thes figures that if the dilation is carried far enough, the result is isotropy. As has been previously mentioned herein, this condition would be undesirable for nipple stock in that it would result in loose joints when the nippes were put to use at the high temperatures employed in electrothermic furnaces, although this condition is desirable for other end uses of graphite bodies.

EXAMPLE II

A mixture of needle-type coke particles (as described in Example I) and pitch binder was heated until plastic and then extruded by means of an extrusion press of the type conventionally used in extruding electrodes, through a die having the conventional internal contour of a Schiele curve. To the exit end of this die was adapted another cylindrical die whose inside diameter was about 15% greater than the diameter of the straight-away section of the extrusion die. The exit end of this enlarged-diameter die was initially plugged and the extrusion operation was commenced. After the enlarged section had filled with the the plastic mixture, the plug was removed and the extrusion continued. Sections of the enlarged extrusion forms were then baked and graphitized in the conventional manner and thermal expansion measurements were then made on transverse and longitudinal sections of these pieces. The values for the transverse and longitudinal coefficients of thermal expansion and the ratio of T/L were approximately the same as they are reported in Table I of Example I.

EXAMPLE III

A mixture of needle coke particles and pitch binder, as employed in Examples I and II, was extruded through a die having the conventional internal contour of a Schiele curve, except that the curved section of the die was modified by grooves machined at such an angle as to impart a relative twisting motion to the mixture being extruded of between 25°–35° with reference to and about the axis of extrusion. As the extruded material left the exit of the die, sections were cut off, baked and graphitized by conventional procedures. Thermal expansion measurements were then made on transverse and longitudinal sections. The transverse and longitudinal coefficients of thermal expansion of these pieces were found to be $47.0 \times 10^{-7}$ and $34 \times 10^{-7}$, respectively, or a $T/L$ ratio of 1.38.

EXAMPLE IV

A needle-type coke, as described in Example I, was ground to a particle size such that about 25% by weight of the particles were coarser than 20 mesh, and 75% of the particles passed a 50 mesh screen. These coke particles were mixed with 30 parts by weight of coal tar pitch binder and heated to a temperature of about 170° C. and this mixture was processed according to the method disclosed in Example I. The extruded pieces had a diameter of ten inches and were then dilated to 12 inches in the manner described in Example I. After baking and graphitizing to a temperature of 2800° C., the thermal expansion measurements were made on transverse and longitudinal sections of the graphite body. The transverse and longitudinal coefficients of thermal expansion were $47.0 \times 10^{-7}$ and $36.1 \times 10^{-7}$, respectively, or a $T/L$ ratio of about 1.23. The modulus of rupture of the graphite body was approximately 2100 pounds per square inch. If the dilated and baked specimen is impregnated with coal tar pitch and then graphitized, the modulus of rupture of the finished graphite body will be approximately 2400 pounds per square inch.

Under certain circumstances, it may be desirable to impregnate the nipple stock after the baking operation, for example, when a considerably higher degree of mechanical strength is required in the electrode train. It is therefore within the scope of my invention to impregnate a baked carbon nipple which has been formed according to my invention with a pitch impregnant, which pitch is derived from distillates from coal tar distillation. One or more impregnations can be conducted, each impregnation being followed by a baking operation to carbonize the hydrocarbon constituents in the impregnant.

This application is a continuation- in-part of my previous application, Serial No. 365,746, filed July 2, 1953, now abandoned for "Apparatus for Connecting Electrodes."

Having thus described my invention, I desire it to be understood that my invention is not to be limited other than as defined by the claims.

I claim:
1. A method for producing a graphite body having improved thermal expansion properties, comprising extruding through a die a mixture of comminuted coke and pitch binder heated to a plastic state, said coke being a needle-like coke, having an average C.T.E. (300°–800° C.) of less than $25 \times 10^{-7}$; and compressing the extruded product in the plastic state in a container in the longitudinal direction so as to effect an increase in the transverse cross-sectional area of said piece to such extent that the ratio of the transverse to the longitudinal average C.T.E. (20°–1400° C.) of the compressed product after baking and graphitizing will be within the range of about 1.2 to about 1.5.

2. A method for producing an improved stock suitable for manufacture of graphite nipples for joining graphite electrodes of about 18 to 24 inches in diameter, comprising extruding through a cylindrical die of about 8 to 12 inches in diameter a mixture of comminuted petroleum coke and pitch binder heated to a plastic state, said coke being a needle-like coke having an average C.T.E. (300°– 800° C.) of less than $25 \times 10^{-7}$; and compressing in a longitudinal direction a piece of the extruded product while in the plastic state in a die of such dimensions as to increase the diameter of said piece between about 1% to about 30%.

3. A method for producing an improved stock for manufacture into graphite nipples for joining graphite electrodes of about 18 to 24 inches in diameter, comprising extruding a cylindrical preform of about 8 to 12 inches in diameter through a die having an internal contour resembling a Schiele curve, from a mixture of comminuted petroleum coke and pitch binder heated to a plastic state, said coke being a needle-like coke having an average C.T.E. (300°–800° C.) of less than $25 \times 10^{-7}$; and compressing in the longitudinal direction said preform heated to a plastic state in a die of such dimensions as to increase its diameter between about 10 to about 20 percent about half-way between the ends thereof, the resulting compressed piece having a uniformly diminishing diameter in the two halves thereof toward its ends due to the internal configuration of the die.

4. A method for producing an improved graphite nipple for joining graphite electrodes of about 18 to 24 inches in diameter, comprising extruding through a die a mixture of comminuted coke and pitch binder heated to a plastic state, said coke being a needle-like coke having an average C.T.E. (300°–800° C.) of less than $25 \times 10^{-7}$; compressing in a die in the longitudinal direction a piece of the extruded product heated to the plastic state so as to effect an increase in the cross-sectional area of said piece to such extent that the ratio of the transverse to longitudinal average C.T.E. (20°–1400° C.) will be within the range of about 1.2 to about 1.5 after baking and graphitizing; and machining the graphitized product to a graphite nipple.

5. A method for producing an improved graphite nipple for joining graphite electrodes of about 18 to 24 inches in diameter, comprising extruding a cylindrical preform of about 8 to 12 inches in diameter through a die having an internal contour resembling a Schiele curve from a mixture of comminuted petroleum coke and pitch binder heated to a plastic state, said coke being a needle-like coke having an average C.T.E. (300°–800° C.) of less than $25 \times 10^{-7}$; placing said preform into a cylindrical container with the axis of said preform substantially aligned with the axis of said container, said container having a diameter greater than the diameter of said preform by about 10 to about 20 percent, reheating said preform to a plastic state and compressing it within said container in the longitudinal direction until it has assumed the shape of said container; removing the compressed product from the container, and baking, graphitizing, and machining it to form a graphite nipple.

6. A process according to claim 2 wherein the barrel of the extrusion die has a rectangular configuration.

7. A process according to claim 2 wherein the plastic mixture of petroleum coke and pitch is extruded in the form of a tube, and the extruded tube is compressed in a mold of approximately the same diameter as said tube to displace the hollow portion thereof.

8. A method for producing a graphite body having improved thermal expansion properties, comprising extruding through a die a mixture of comminuted coke and pitch binder heated to a plastic state, said coke being a needle-like coke having an average C.T.E. (300°–800° C.) of less than $25 \times 10^{-7}$; and dilating the extruded product in the plastic state in a container in the longitudinal direction so as to effect an increase in the transverse cross-sectional area of said piece to such extent that the ratio of the transverse to the longitudinal average C.T.E. (20°– 1400° C.) of the compressed product after baking and graphitizing will be within the range of about 1.2 to about 1.5.

9. A method for producing an improved graphite nipple for joining graphite electrodes of about 18 to 24 inches in diameter, comprising extruding a cylindrical preform of about 8 to 12 inches in diameter through a die having an internal contour resembling a Schiele curve, from a mixture of comminuted petroleum coke and pitch binder heated to a plastic state, said coke being a needle-like coke having an average C.T.E. (300°–800° C.) of less than $25 \times 10^{-7}$; placing said preform into a cylindrical container with the axis of said preform substantially aligned with the axis of said container, said container having a diameter greater than the diameter of said preform by about 10 to about 20 percent, reheating said preform to a plastic state and dilating and compressing it within said container in the longitudinal direction until it has assumed the shape of said container; removing the compressed product from the die, and baking, graphitizing, and machining it to form a graphite nipple.

10. A graphite body suitable for joining large-diameter electrodes having a modulus of rupture greater than 2000 p.s.i., a transverse average C.T.E. (20°–1400° C.) of between about 45 to 49 and a longitudinal average C.T.E. (20°–1400° C.) of between about 32 to 40, the ratio of the transverse to longitudinal average C.T.E. of said graphite body being within the range of about 1.2 to 1.5, said graphite body consisting essentially of needle-like particles such that not more than 25% by weight of the particles are coarser than 20 mesh and at least 50% by weight of the particles are finer than 40 mesh.

References Cited in the file of this patent

UNITED STATES PATENTS

| | | |
|---|---|---|
| 2,471,531 | McIntyre et al. | May 31, 1949 |
| 2,510,230 | Johnson et al. | June 6, 1950 |
| 2,527,294 | Bailey | Oct. 24, 1950 |
| 2,563,285 | Shea et al. | Aug. 7, 1951 |
| 2,582,764 | Bailey | Jan. 15, 1952 |